United States Patent
Emamjomeh et al.

(10) Patent No.: US 10,800,153 B2
(45) Date of Patent: Oct. 13, 2020

(54) GENERATING THREE-DIMENSIONAL OBJECTS

(71) Applicant: Hewlett-Packard Development Company, L.P., Houston, TX (US)

(72) Inventors: Ali Emamjomeh, San Diego, CA (US); Eric G. Wiesner, San Diego, CA (US); Winthrop Childers, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 747 days.

(21) Appl. No.: 15/518,753

(22) PCT Filed: Nov. 20, 2014

(86) PCT No.: PCT/US2014/066523
§ 371 (c)(1),
(2) Date: Apr. 12, 2017

(87) PCT Pub. No.: WO2016/080993
PCT Pub. Date: May 26, 2016

(65) Prior Publication Data
US 2017/0232677 A1    Aug. 17, 2017

(51) Int. Cl.
*B29C 64/165* (2017.01)
*B29C 64/386* (2017.01)
(Continued)

(52) U.S. Cl.
CPC ............ *B33Y 10/00* (2014.12); *B29C 64/165* (2017.08); *B29C 64/386* (2017.08); *B33Y 30/00* (2014.12);
(Continued)

(58) Field of Classification Search
None
See application file for complete search history.

(56) References Cited

U.S. PATENT DOCUMENTS

| | | | |
|---|---|---|---|
| 5,204,055 A | 4/1993 | Sachs et al. | |
| 5,340,656 A | 8/1994 | Sachs et al. | |

(Continued)

FOREIGN PATENT DOCUMENTS

| | | |
|---|---|---|
| CN | 1976799 B | 4/2012 |
| CN | 203888214 U | 10/2014 |

(Continued)

OTHER PUBLICATIONS

International Search Report and Written Opinion for International Application No. PCT/US2014/066523 dated Jul. 22, 2015, 9 pages.

*Primary Examiner* — Jacob T Minskey
*Assistant Examiner* — Baileigh Kate Darnell
(74) *Attorney, Agent, or Firm* — HP Inc. Patent Department

(57) ABSTRACT

A three-dimensional object may be generated. First and second agent distributors may be to respectively selectively deliver a binder agent and a coalescing agent onto portions of a layer of build material. A controller may be to control the first and second agent distributors to respectively selectively deliver the binder agent and the coalescing agent onto respective first and second portions of the layer in patterns derived from data representing a slice of the three-dimensional object to be generated. The first portion having the binder agent may be to bind and solidify into a binder matrix. When energy is applied to the layer the second portion having the second agent may be to coalesce and solidify.

11 Claims, 4 Drawing Sheets

(51) Int. Cl.
  *B33Y 10/00* (2015.01)
  *B33Y 30/00* (2015.01)
  *B33Y 50/02* (2015.01)
  *B29K 105/00* (2006.01)

(52) U.S. Cl.
  CPC ...... *B33Y 50/02* (2014.12); *B29K 2105/0032* (2013.01)

(56) References Cited

U.S. PATENT DOCUMENTS

| | | | |
|---|---|---|---|
| 5,387,380 A | 2/1995 | Cima et al. | |
| 5,749,041 A | 5/1998 | Lakshminarayan et al. | |
| 6,217,816 B1 | 4/2001 | Tang | |
| 6,554,882 B1 | 4/2003 | Zhou et al. | |
| 6,652,256 B2* | 11/2003 | Coe | B33Y 30/00 425/130 |
| 6,989,115 B2* | 1/2006 | Russell | B29C 41/12 264/39 |
| 7,220,380 B2 | 5/2007 | Farr et al. | |
| 7,285,234 B2 | 10/2007 | Pfeifer et al. | |
| 7,365,129 B2 | 4/2008 | Kramer et al. | |
| 7,435,072 B2 | 10/2008 | Collins et al. | |
| 7,611,756 B2 | 11/2009 | Pfeifer et al. | |
| 7,722,802 B2 | 5/2010 | Pfeifer et al. | |
| 2004/0175451 A1* | 9/2004 | Maekawa | B29C 41/36 425/144 |
| 2004/0187714 A1* | 9/2004 | Napadensky | B29C 64/10 101/35 |
| 2005/0059757 A1 | 3/2005 | Bredt et al. | |
| 2006/0159869 A1* | 7/2006 | Kramer | B41M 5/00 428/15 |
| 2007/0238056 A1 | 10/2007 | Baumann et al. | |
| 2010/0191360 A1* | 7/2010 | Napadensky | G06T 17/00 700/98 |
| 2010/0195122 A1* | 8/2010 | Kritchman | B33Y 50/00 358/1.9 |
| 2012/0193841 A1 | 8/2012 | Wang et al. | |
| 2013/0072614 A1 | 3/2013 | Lindstrom et al. | |
| 2015/0183162 A1* | 7/2015 | Kuk | B33Y 30/00 264/129 |
| 2017/0028461 A1* | 2/2017 | Fujiwara | B28B 1/001 |
| 2017/0087772 A1* | 3/2017 | Hakkaku | B29C 64/112 |

FOREIGN PATENT DOCUMENTS

JP 2004291625 10/2004
KR 1020060071340 6/2006

* cited by examiner

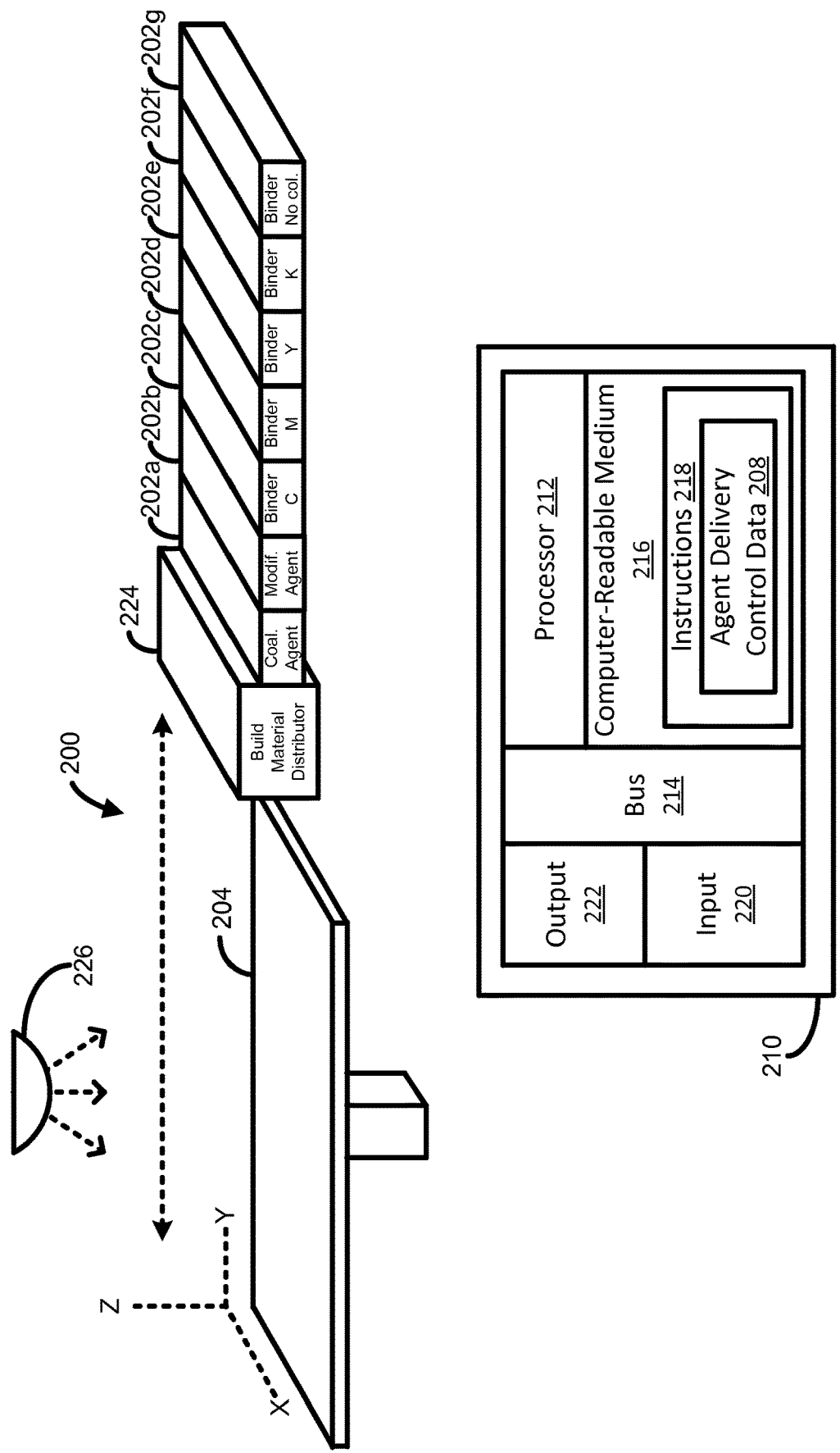

GENERATING THREE-DIMENSIONAL OBJECTS

BACKGROUND

Additive manufacturing systems that generate three-dimensional objects on a layer-by-layer basis have been proposed as a potentially efficient way to produce three-dimensional objects such as customized articles of manufacture or prototypes. The resolution and material properties of objects produced by such systems may vary widely depending on the type of additive manufacturing technology used.

BRIEF DESCRIPTION

Some examples are described with respect to the following figures:

FIG. 2 is a simplified isometric schematic illustration of an additive manufacturing system according to some examples;

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used.

In some examples, solidification may be achieved using of a coalescing agent, which is a material that, when a suitable amount of energy is applied to a combination of build material and coalescing agent, may cause the build material to coalesce and solidify. Coalescence is when particles or masses of the build material form a larger mass, for example particles may be thermally fusible such that a rise in temperature may melt and coalesce the particles directly together. The build material may, for example, include other components that may aid in coalescence, and in examples in which the build material is powdered, aid in powder flow. In these examples, objects may, for example, achieve high strength. However, such objects may, for example, experience internal tensile stress and/or shrinkage when solidified, which may affect the sizes of objects that can be generated, for example larger objects may experience deformities.

In some examples, solidification may be achieved using a binder agent which binds and solidifies build material into a binder matrix, which is a mixture of generally separate particles or masses of build material that are adhesively bound together by a binder agent. In these examples, objects may, for example, experience expansion and/or compressive stress when solidified, but may, for example, not achieve high strength. The presence of colorants in binder agents may, in some examples, have little or no effect on binding and solidification.

Accordingly, the present disclosure provides, in some examples, hybrid systems and methods for generating three-dimensional objects both by applying coalescing agent and energy in a first region of the object and applying a binder agent in a second region of the object. This may, for example, allow modulation and optimization of a wide variety of object properties. For example, the tensile stress and shrinkage in the first region may be offset by compressive stress and expansion in the second region. This may also, for example, allow generation of larger objects that exhibit high quality properties including high strength. This may also, for example, allow coloration of objects without affecting any other object properties.

Figure 1A:
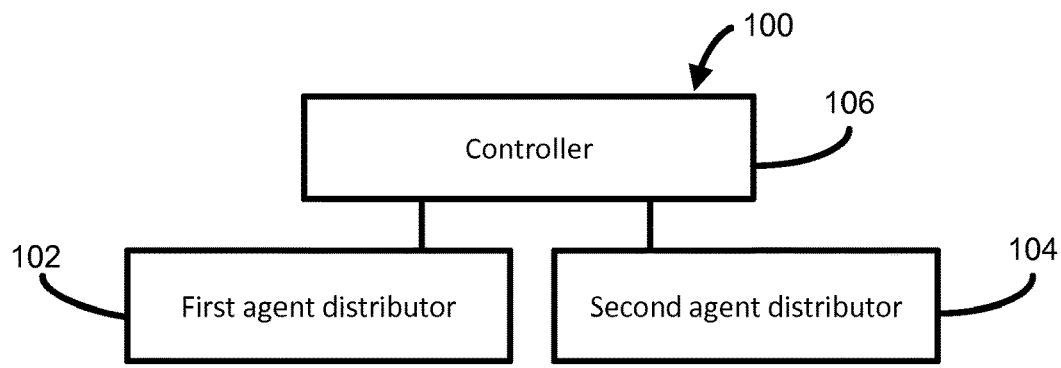
FIG. 1a illustrates a system for generating a three-dimensional object according to some examples.

FIG. 1a is a block diagram illustrating a system 100 for generating a three-dimensional object according to some examples. The system 100 may include first and second agent distributors 102 and 104 to respectively selectively deliver a binder agent and a coalescing agent onto portions of a layer of build material. A controller 106 may be to control the first and second agent distributors to respectively selectively deliver the binder agent and the coalescing agent onto respective first and second portions of the layer in patterns derived from data representing a slice of the three-dimensional object to be generated. The first portion having the binder agent may be to bind and solidify into a binder matrix. When energy is applied to the layer the second portion having the second agent may be to coalesce and solidify.

Figure 1B:
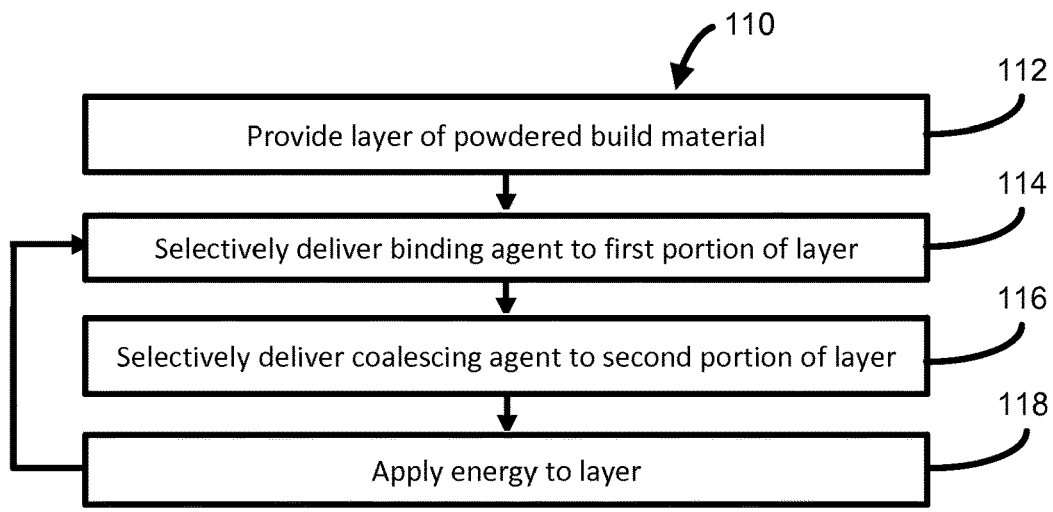
FIG. 1b is a flow diagram illustrating a method for generating a three-dimensional object according to some examples.

FIG. 1b is a flow diagram illustrating a method 110 for generating a three-dimensional object according to some examples. In some examples, the orderings shown may be varied (e.g. 116 may occur before 114), some elements may occur simultaneously (e.g. 114 and 116 may occur simultaneously), some elements may be added, and/or some elements may be omitted. At 112, a layer of powdered build material may be provided on a support member. At 114, a binding agent may be selectively delivered to a first portion of the layer to cause a binder matrix to form in the first portion. At 116, a coalescing agent may be selectively delivered to a second portion of the layer that does not overlap with the first portion. At 118, energy may be applied to the layer to cause the first portion to coalesce and subsequently solidify. In some examples, an additional third portion may receive both binder agent and coalescing agent, but this is not necessary.

Figure 1C:
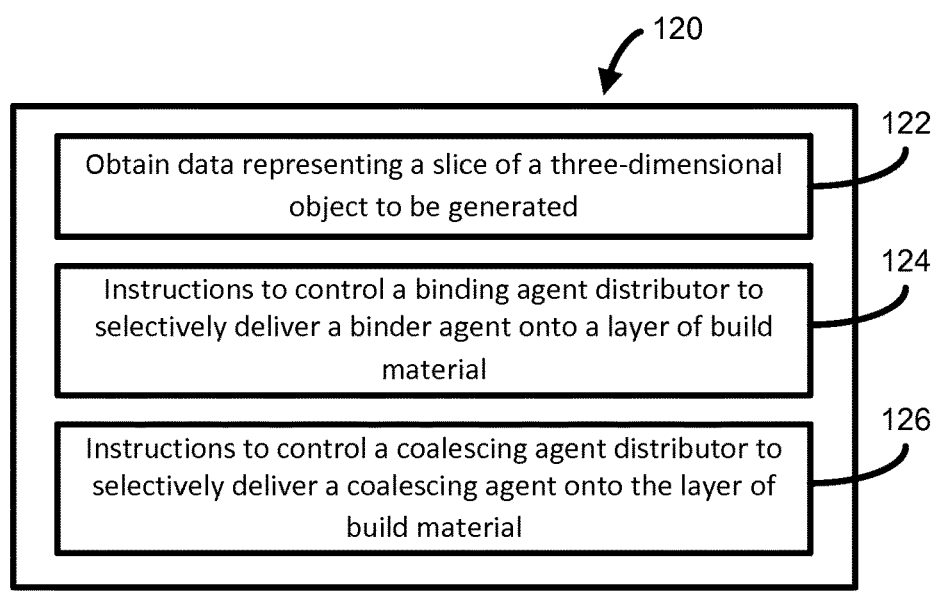
FIG. 1c is a block diagram illustrating a non-transitory computer readable storage medium according to some examples.

FIG. 1c is a block diagram illustrating a non-transitory computer readable storage medium 120 according to some examples. The non-transitory computer readable storage medium 120 may include instructions 122 that, when executed by a processor, cause the processor to obtain data representing a slice of a three-dimensional object to be generated. The non-transitory computer readable storage medium 120 may include instructions 124 that, when executed by a processor, cause the processor to control a binding agent distributor to selectively deliver a binder agent onto a first portion of a layer of build material in a first pattern derived from the data, wherein the first portion receiving the binder agent is to bind into a binder matrix. The non-transitory computer readable storage medium may include instructions 124 that, when executed by the processor, cause the processor to control a coalescing agent distributor to selectively deliver a coalescing agent onto the first portion of the layer in the first pattern or onto a second portion of the layer in a second pattern derived from the data, the second pattern different than the first pattern, wherein the first or second portion having the coalescing agent is to coalesce when energy is applied to the layer.

FIG. 2 is a simplified isometric schematic illustration of an additive manufacturing system 200 according to some examples. The system 200 may be operated, as described further below with reference to the flow diagram of FIG. 3 to generate a three-dimensional object.

In some examples, build material may be selected to facilitate coalescing using a coalescing agent and binding using a binder agent. In some examples, a mixture of two build materials may be selected such that one build material facilitates coalescing using the coalescing agent and the other build material facilitates binding using a binder agent. In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable powdered build material may be Nylon 11 (polyamide 11) or Nylon 12 (polyamide 12), which are available, for example, from Sigma-Aldrich Co. LLC, and which may be suitable for coalescence using of coalescing agent and binding using binder agent. Another suitable Nylon 12 material may be PA 2200 which is available from Electro Optical Systems EOS GmbH. Another suitable powdered build material may be calcium hemihydrate, which may be suitable for binding using a binder agent. Other examples of suitable build materials may include, for example, powdered metal materials, powdered composite materials, powdered ceramic materials, powdered glass materials, powdered resin material, powdered polymer materials, and the like, and combinations thereof. Other examples of suitable build materials may include powdered polymers that are amorphous, semi-crystalline, crystalline, and/or combinations thereof. In some examples, the build material may comprise a polymer including phenylethene (styrene), acrylates, polyethylenes, polyolefins, polyesters, polyurethanes, polypropylenes, acrylics, polyaryletherketone, various amides, various amines, other suitable polymers, and/or combinations thereof. In some examples, amorphous build materials may be used, e.g. acrylonitrile butadiene styrene (ABS) or polycarbonate. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material. In some examples, any mixtures or combinations of the above build materials may be used.

The additive manufacturing system 200 may include a system controller 210. Any of the operations and methods disclosed herein may be implemented and controlled by the controller 210.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as a keyboard, touchpad, buttons, keypad, dials, mouse, track-ball, card reader, or other input devices. Additionally, the additive manufacturing system 200 may include output devices 222 coupled to the processor 212, such as a liquid crystal display (LCD), video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any of the methods or operations disclosed herein according to various examples.

The system 200 may include agent distributors 202a-g as shown in FIG. 2.

A coalescing agent distributor 202a may be to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light absorbers are dye based colored ink and pigment based colored ink, such as inks commercially known as CM993A and CE042A available from Hewlett-Packard Company. In some examples the coalescing agent may comprise a liquid carrier, such as water or any other suitable solvent or dispersant.

Agent distributors 202c-g may be to selectively deliver binder agents to successive layers of build material provided on a support member 204. According to one non-limiting example, a suitable agent may include a fluid (e.g. liquid) comprising, for example, an activation agent, e.g an adhesive such as polyvinyl alcohol (PVOH), polyvinyl acetate (PVA) or polymeric resin. The adhesive may comprise about 5 to about 50 percent of the weight of the agent. The binder agent may, for example, also include a non-reactive polymer that may comprise about 5 to about 50 percent of the weight of the agent. The binder agent may, for example, also include a colorant such as a dye or pigment. In the example of FIG. 2, the colorants included in each respective agent delivered by respective agent distributors 202c-f are cyan (C), magenta (M), yellow (Y), and black (K) colorants according to a subtractive color model, for example, if such agents are used to provide color on borders of a generated object. The agent delivered by agent distributor 202g may not include a colorant, for example if the agent is used to generate portions of an interior of an object. In some examples, the binder agents may each, for example, also include a liquid carrier, such as water or any other suitable solvent or dispersant. In some examples, an additional agent distributor may be to deliver a binder agent having a white (W) colorant.

In some examples, the adhesive may be included in the build material rather than in the binder agent. For example, the build material may include a powder (e.g. a polymer powder such as polyamide 11 or 12), amorphous build material, or other type of build material. The build material may, for example, comprise about 45 to about 70 percent of the weight of the build material. The build material may, for example, also include an activatable agent (e.g. an adhesive such as polyvinyl alcohol, polyvinyl acetate, or polymeric resin) that may comprise about 4 to about 8 percent of the weight of the build material. The build material may, for example, also include a plaster that may comprise about 25 to about 45 percent of the weight of the build material. The build material may, for example, also include an accelerator that may comprise about 1 to about 3 percent of the weight of the build material. Inclusion of the accelerator may, for example, increase the speed of binding. The adhesive, plaster, and accelerator may be interspersed in the powder, or may be formed as a thin reactive coating on the surface of each layer of delivered powder. Thus, in these examples, the binder agent may comprise a fluid (e.g. water) that may activate the adhesive in the build material when the agent is delivered to the build material, such that the build material having the adhesive and delivered binder agent (e.g. fluid) binds and solidifies into a binder matrix. The adhesive may be soluble in the delivered fluid of the binder agent.

A binding modifier agent distributor 202b to selectively deliver binding modifier agent to a layer of build material provided on the support member 204. A binding modifier agent may serve to modify, e.g. increase or reduce, the degree of binding of a portion of build material on which the binding modifier agent has been delivered or has penetrated. Different physical and/or chemical effects may be used to modify the effects of a binder agent. An example of a binding modifier agent that may reduce the degree of binding may, for example, be a repellant such as a fluid with wax particles. In some examples the binding modifier agent may comprise a liquid carrier, such as water or any other suitable solvent or dispersant.

In one example the support member 204 has dimensions in the range of from about 10 cm by 10 cm up to 100 cm by 100 cm. In other examples the support member 204 may have larger or smaller dimensions. The support member 204 may be a fixed part of the system 200, or may not be a fixed part of the system 200, instead being, for example, a part of a removable module.

The controller 210 controls the selective delivery of agents to a layer of provided build material in accordance with instructions 218 comprising agent delivery control data 208. The agent distributors 202a-g may each include a supply of suitable agent or may be connectable to a separate supply of suitable agent.

The agent distributors 202a-g may be printheads, such as thermal printheads or piezo inkjet printheads. The printheads may have arrays of nozzles. In one example, printheads such as those commonly used in commercially available inkjet printers may be used. In other examples, the agents may be delivered through spray nozzles rather than through printheads. Other delivery mechanisms may be used as well.

The agent distributors 202a-g may be used to selectively deliver, e.g. deposit, the agents when in the form of suitable fluids such as liquids. In some examples, the agent distributors 202a-g may be selected to deliver drops of agent at a resolution of between 300 to 1200 dots per inch (DPI), for example 600 DPI. In other examples the agent distributors 202a-g may be selected to be able to deliver drops of agent at a higher or lower resolution. In some examples, the agent distributors 202a-g may have an array of nozzles through which the agent distributors 202a-g are able to selectively eject drops of fluid. In some examples, each drop may be in the order of about 10 pico liters (pl) per drop, although in other examples agent distributors 202a-g that are able to deliver a higher or lower drop size may be used. In some examples agent distributors 202 and 206 that are able to deliver variable size drops may be used. In some examples the printhead may be a drop-on-demand printhead. In other examples the printhead may be a continuous drop printhead.

In some examples, the agent distributors 202a-g may be an integral part of the system 200. In some examples, the agent distributors 202a-g may be user replaceable, in which case they may be removably insertable into suitable agent distributor receivers or interfaces of the system 200.

In some examples a single agent distributor, such as a printhead, may be used to selectively deliver multiple agents. For example, different sets of nozzles may be to deliver different agents.

In the example illustrated in FIG. 2, the agent distributors 202a-g have a length that enables them to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributors 202a-g may have a shorter length that does not enable them to span the whole width of the support member 204.

The agent distributors 202a-g may be mounted on a moveable carriage to enable them to move bi-directionally across the length of the support member 204 along the illustrated y-axis. This enables selective delivery of agents across the whole width and length of the support member 204 in a single pass. In other examples the agent distributors 202*a-g* may be fixed, and the support member 204 may move relative to the agent distributors 202*a-g*.

It should be noted that the term 'width' used herein is used to generally denote the shortest dimension in the plane parallel to the x and y axes illustrated in FIG. 2, whilst the term 'length' used herein is used to generally denote the longest dimension in this plane. However, it will be understood that in other examples the term 'width' may be interchangeable with the term 'length'. For example, in other examples the agent distributors 202*a-g* may have a length that enables them to span the whole length of the support member 204 whilst the moveable carriage may move bi-directionally across the width of the support 204.

In another example the agent distributors 202*a-g* do not have a length that enables them to span the whole width of the support member 204 but are additionally movable bi-directionally across the width of the support member 204 in the illustrated x-axis. This configuration enables selective delivery of agents across the whole width and length of the support 204 using multiple passes. Other configurations, however, such as a page-wide array configuration, may enable three-dimensional objects to be created faster.

The system 200 may further comprise a build material distributor 224 to provide, e.g. deliver or form, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module. In some examples, the build material distributor 224 may be mounted on a carriage.

In some examples, the build material distributor 224 may be to provide a layer of build material having a thickness in the range of between about 20 to about 200 microns, or about 50 to about 300 microns, or about 90 to about 110 microns, or about 25 microns, or about 50 microns, or about 75 microns, or about 100 microns, or about 250 microns, although in other examples thinner or thicker layers of build material may be provided. The thickness may be controlled by the controller 210, for example based on the instructions 218, including for example object design data defining the three-dimensional object to be generated.

In some examples, there may be any number of additional agent distributors and build material distributors relative to the distributors shown in FIG. 2. In some examples, the distributors of system 200 may be located on the same carriage, either adjacent to each other or separated by a short distance. In other examples, two or more carriages each may contain distributors. For example, each distributor may be located in its own separate carriage. Any additional distributors may have similar features as those discussed earlier with reference to the agent distributors 202*a-g*.

In the example shown the support member 204 is moveable in the z-axis such that as new layers of build material are deposited a predetermined gap is maintained between the surface of the most recently deposited layer of build material and lower surfaces of the agent distributors 202*a-g*. In other examples, however, the support member 204 may not be movable in the z-axis and the agent distributors 202*a-g* may be movable in the z-axis.

The system 200 may additionally include an energy source 226. The energy source 226 may be to apply energy to build material to cause the solidification of portions of the build material according to where coalescing agent has been delivered or has penetrated. In some examples, a portion of build material having binder agent may be curable to form a binder matrix in response to application of energy, e.g. ultraviolet (UV) energy. However, in other examples the portion having binder agent may solidify into a binder matrix without application of energy for curing or drying. In examples in which the portion having binder agent is curable, the energy source 226 may also be to cure or dry the portion having binder agent to solidify the portion into a binder matrix.

In some examples, the energy source 226 is an infra-red (IR) radiation source, near infra-red radiation source, visible light source, microwave energy source, ultraviolet (UV) radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 may be a single energy source that is able to uniformly apply energy to build material. In some examples, the energy source 226 may comprise an array of energy sources. In some examples, the energy source 226 may include a first energy source to apply suitable energy to cause solidification of portions of build material according to where coalescing agent has been delivered or penetration, and a second energy source to apply suitable energy, e.g. UV energy, to cure or dry a portion having binder agent into a solidified binder matrix.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material, for example in accordance with instructions 208. For example, the controller 210 may control the energy source to apply energy to portions of build material on which coalescing agent has been applied and/or to portions having binder agent, but not to portions on which coalescing agent has not been applied and/or which do not have a binder agent.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered and/or portions having a binder agent.

The combination of the energy supplied, the build material, and the coalescing agent, binding modifier agent, and binder agent may be selected such that: i) portions of the build material on which no coalescing agent have been delivered do not coalesce when energy is temporarily applied thereto; ii) portions of the build material on which there is no binder agent do not form a binder matrix; iii) portions of the build material having a binder agent but not binding modifier agent solidifies into a binder matrix, either with or without application of curing energy, depending on whether the portion having binder agent requires curing to solidify; iv) portions of the build material having a coalescing agent and binder agent, but not binding modifier agent, coalesces upon application of energy and also bind into a binder matrix either with or without application of curing energy, depending on whether the build material and binder agent requires curing to bind; v) portions of the build material having binding modifier agent but not coalescing agent nor binder agent do not coalesce or bind when energy is temporarily applied thereto; vi) portions of the build material having both binder agent and binding modifier agent may undergo a modified, e.g. increased or reduced, degree of binding, for example to modulate or tune mechanical properties of these portions.

In some examples, the system 200 may additionally comprise a pre-heater to maintain build material deposited on the support member 204 within a predetermined temperature range. Use of a pre-heater may help reduce the amount of energy that has to be applied by the energy source 226 to cause coalescence and subsequent solidification of build material on which coalescing agent has been delivered or has penetrated.

Figure 3:
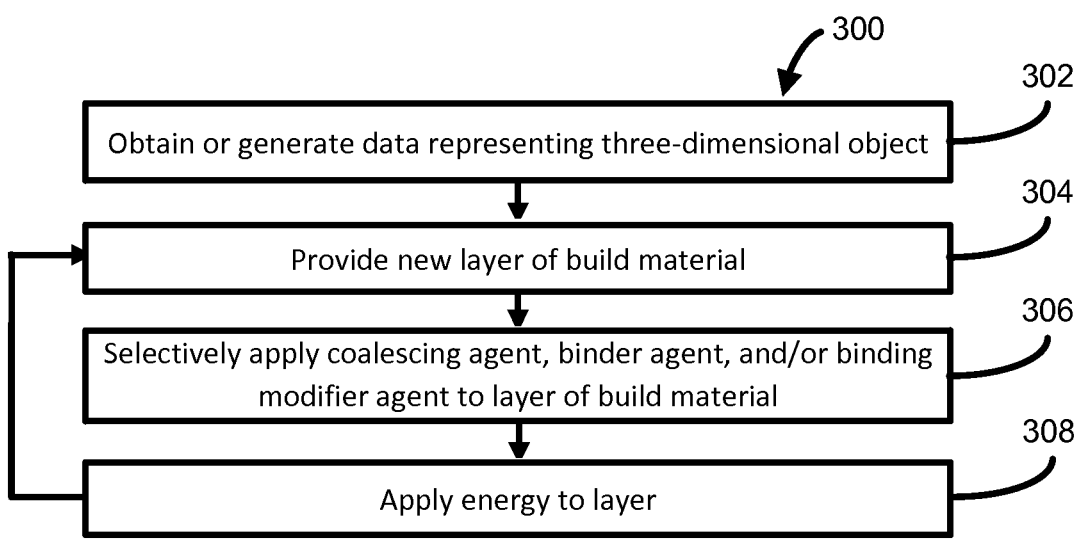
FIG. 3 is a flow diagram illustrating a method of generating a three-dimensional object according to some examples.

FIG. 3 is a flow diagram illustrating a method 300 of generating a three-dimensional object according to some examples. Aspects of the method may be computer implemented. In some examples, the orderings shown may be varied, some elements may occur simultaneously, some elements may be added, and/or some elements may be omitted. In describing FIG. 3, reference will be made to FIGS. 2, 4a-4d, and 5. FIGS. 4a-d show a series of cross-sectional side views of layers of build material according to some examples. FIGS. 5-9 show cross-sectional top view of layers of build material according to some examples.

At 302, agent delivery control data 208 may be generated or obtained by the controller 210. The agent delivery control data 208 which may define for each slice of the three-dimensional object to be generated the portions or the locations on the build material, if any, at which the various agents are to be delivered.

In some examples, the agent delivery control data 208 may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

The agent delivery control data 208 may describe, for each layer of build material to be processed, locations or portions on the build material at which the various agents are to be delivered by agent distributors 202a-g. In one example the locations or portions of the build material at which the agents are to be delivered are defined by way of respective patterns.

Figure 4A:
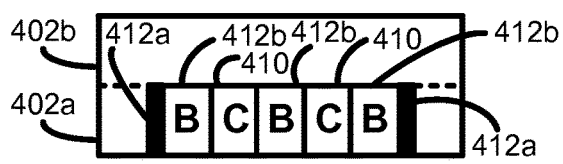
FIG. 4a shows a cross-sectional side view of a layer of build material according to some examples.
Figure 4C:
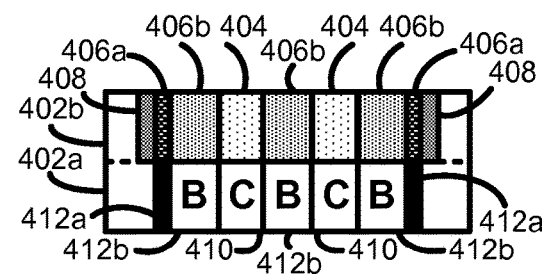
FIG. 4c shows a cross-sectional side view of a layer of build material according to some examples.

Iterations of 304 to 308 may then be performed to generate the three-dimensional object, as will be described. FIG. 5 is a cross-sectional top view of a layer 402a of a build material provided by a build material distributor 224 and which has been solidified by applying agents and energy, as described with reference to FIG. 2. FIG. 4a represents a cross section taken through 4a-4a of FIG. 5. In FIGS. 4a-4d and 5, as well in other examples shown in FIGS. 6-8, the portions 412b, 512, and 712b labeled "B" are portions of build material that have received a binder agent 406b lacking colorant, the portions 410, 510, 610, and 710 labeled "C" are those that have received a coalescing agent 404, and portions 714 that are labeled "C/B" are those that have received both a coalescing agent 404 and a binder agent 406b lacking colorant. The "B" and "C" portions in FIG. 4a are therefore cross-sectional representations of the "B" and C" portions of FIG. 5. In FIGS. 4a-d and 5, the portions 412a are portions of build material that have received a binder agent 406a having colorant. Portions of the build material may also receive binding modifier agent 408, as shown in FIGS. 4a-d and 5.

In FIG. 5, adjacent portions of which one contains a "B" and the other contains a "C" are non-overlapping portions in which a binder agent or a coalescing agent are respectively delivered. The lines between the "B" and C" portions may represent a zone which is of zero width or may have a finite width. In the example of finite width, each line may represent a thin portion of build material on which no binder agent or coalescing agent is delivered, or may instead be a "C/B" portion in which both coalescing agent and binding agent are delivered, such that there some overlap between the binder agent and the coalescing agent.

At 304, a layer 402b of build material may be provided, as shown in FIG. 4a and FIG. 5. For example, the controller 210 may control the build material distributor 224 to provide the layer 402b on a previously completed layer 402a on the support member 204 by causing the build material distributor 224 to move along the y-axis as discussed earlier. The completed layer 402a, as shown in FIGS. 4a and 5, may include patterns of solidified portions 410, 412a, and 412b. The interior solidified portions 410 (labeled with a "C") may be portions on which coalescing agent and energy was applied thereto to coalesce and solidify the portions. The exterior solidified portions 412a (labeled with a "B") may be portions on which binder agents having colorants, e.g. any combination of one, two, three, or four CMYK binder agents from agent distributors 202c-202f, were applied thereto to bind and solidify the portions into binder matrices that provide a color on the exterior of the object. The interior solidified portions 412b may be portions on which binder agents lacking colorants, e.g. from agent distributor 202g, were applied thereto to bind and solidify the portions into binder matrices in the interior of the object.

As shown, the portions 412b solidified using binder agent may form a single contiguous filled area in the interior. By contrast, the portions 410 solidified using coalescing agent may be multiple scattered domains within the single contiguous filled area defined by portions 412b. In other examples, portions solidified using coalescing agent may instead form the contiguous fill, and the portions solidified using binder agent may be scattered domains within the contiguous fill of the portions solidified using coalescing agent.

Although a completed layer 402a is shown in FIGS. 4a-d for illustrative purposes, it is understood that 304 to 308 may initially be applied to generate the layer 402a. Moreover, although not shown, additional layers may have been generated prior to layer 402a, including a layer defining a bottom exterior boundary of the object generating using the CMYK binder agents.

Figure 4B:
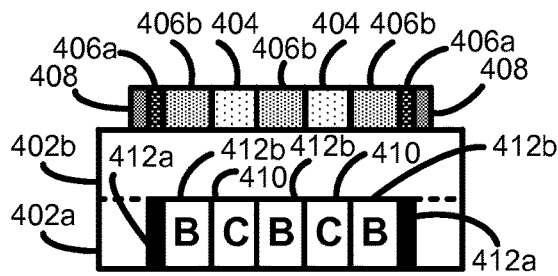
FIG. 4b shows a cross-sectional side view of a layer of build material according to some examples.
Figure 5:
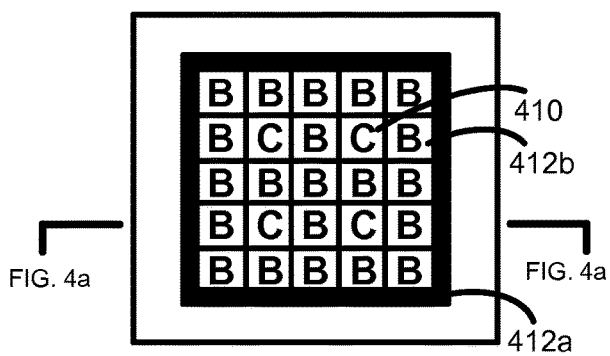
FIG. 5 shows a cross-sectional top view of a layer of build material according to some examples.

At 306, as shown in FIG. 4b, coalescing agent 404, binder agent 406a having colorant (e.g. any combination of one, two, three, or four CMYK binder agents), binder agent 406b lacking colorant, and binding modifier agent 408 may be selectively delivered to the surface of portions of the layer 402b. As discussed earlier, the agents may be delivered by agent distributor 202a-g, for example in the form of fluids such as liquid droplets. As discussed earlier, the binder agents 406a-b may include an adhesive, or instead, the build material may include the adhesive.

The coalescing agent 404, binder agents 406a-b, and binding modifier agent 408 may be delivered in patterns on the portions of the layer 402b that the agent delivery control data 208 may define to become solid to form part of the three-dimensional object being generated. The agent delivery control data 208 may be derived from a model of a three-dimensional object to be generated. "Selective delivery" means that agent may be delivered to selected portions of the surface layer of the build material in various patterns.

In some examples, coalescing agent 404 may be selectively delivered to a portion of build material according to a first pattern, binder agent 406a may be selectively delivered to a portion of build material according to a second pattern, binder agent 406b may be selectively delivered to a portion of build material according to a third pattern, and binding modifier agent 408 may be selectively delivered to a portion of build material according to a fourth pattern. In the example of FIGS. 4a-d and 5, the patterns in layer 402b are the same as the patterns in layer 402a, however in other examples they may vary on a layer-to-layer basis.

FIG. 4c shows the agents 404, 406a-b, and 408 having penetrated into the portions of the layer 402b of build material. The degree to which the agents penetrate may differ between the different agents, or may be substantially the same. FIG. 4c shows the agents 404, 406a-b, and 408 having penetrated substantially completely into the portions of the layer 402b of build material, but in other examples, the degree of penetration may be less than 100%. The degree of penetration may depend, for example, on the quantity of agent delivered, on the nature of the build material, on the nature of the agent, etc.

Although for illustrative purposes the delivery and penetration of each agent is shown to occur substantially at a similar time, in other examples the agents may be delivered in any other order, including but not limited to: (i) 406a, then 406b, then 404, then 408; (ii) 406a, then 406b, then 408, then 404; (iii) 404, then 406a, then 406b, then 408; (ii) 404, then 408, then 406a, then 406b; (ii) 408, then 404, then 406a, then 406b; or (ii) 408, then 406a, then 406b, then 404.

Figure 4D:
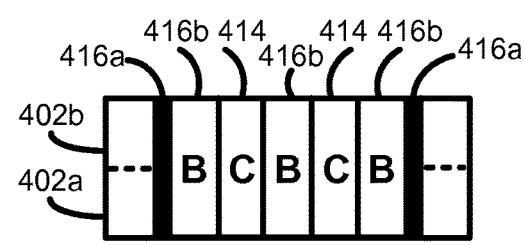
FIG. 4d shows a cross-sectional side view of a layer of build material according to some examples.

At 308, a predetermined level of energy may be temporarily applied to the layer 402b of build material. In various examples, the energy applied may be infra-red or near infra-red energy, visible light, microwave energy, ultra-violet (UV) light, halogen light, ultra-sonic energy, or the like. The temporary application of energy may cause the portions of the build material on which coalescing agent 404 was delivered to heat up above the melting point of the build material and to coalesce. In some examples, the energy source may be focused. In other examples, the energy source may be unfocused, and the temporary application of energy may cause the portions of the build material on which coalescing agent 404 has been delivered or has penetrated to heat up above the melting point of the build material and to coalesce. For example, the temperature of some or all of the layer 402b may achieve about 220 degrees Celsius. Upon cooling, the portions having coalescing agent 404 may become solid and form part of the three-dimensional object being generated, as shown in FIG. 4d.

In some examples, temporary application of energy, e.g. UV light, may cause portions of the build material on which binder agent 406a-b is present to be cured or dried into a binder matrix, as discussed earlier. This may be done using the same or different energy source as the energy source used to cause portions having coalescing agent to coalesce. The energy applied for curing or drying may be applied before, at the same time as, or after the energy applied for coalescence.

However, in other examples, portions of build material on which binder agents 406a-b are delivered and penetrated may bind and solidify into a binder matrix without any application of energy.

In some examples, in an effect called "bleed", some adhesive of the binder agent 406a may propagate outwardly into build material to solidify portions that are not intended to be solidified. By applying binding modifier agent 408 around the exterior of the boundary defined by the binder agent 406a, binding in these undesired regions may be reduced or prevented, thus providing greater accuracy and superior exterior surface properties on the object.

As discussed earlier, solidified portions including portions 410 and 412a-b may have been generated in a previous iteration of 304 to 308. The heat absorbed during the application of energy may propagate to the previously solidified portions 410 to cause part of portions 410 to heat up above their melting point. Additionally, the portions 412a-b having binder matrices in layers 402a may bind with newly created binder matrices in layer 402b to create solidified portions 416a-b. These effects help create solidified portions having strong interlayer bonding between adjacent layers of solidified build material, as shown in FIG. 4d.

After a layer of build material has been processed as described above in 304 to 308, new layers of build material may be provided on top of the previously processed layer of build material. In this way, the previously processed layer of build material acts as a support for a subsequent layer of build material. The process of 304 to 308 may then be repeated to generate a three-dimensional object layer by layer.

The three-dimensional object generated using method 300 may, for example, allow modulation and optimization of object properties. In some examples, the solidified portions 414 using coalescing agent may act as strengthening fibers that may be intertwined throughout the three-dimensional interior of the object, but may be limited in volume and may be isolated from each other so as to avoid object shrinkage and tensile stress. Meanwhile, the expansion and compressive stress of portions 412a-b may compensate for the shrinkage in the portions 414 and may allow for greater accuracy when generating large objects. The method 300 may, for example, also allow high quality color, e.g. on the boundary of the object, without affecting other object properties. In some examples, the elastic modulus in different portions of the object may be controllably variable such that different portions may have different elastic moduli.

Figure 6:
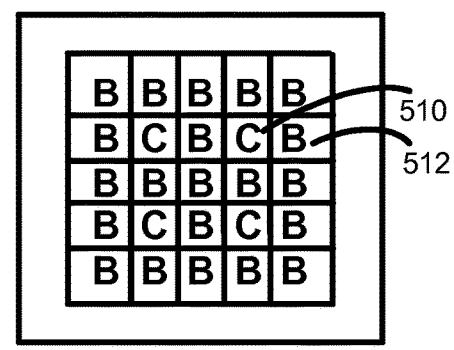
FIG. 6 shows a cross-sectional top view of a layer of build material according to some examples.

FIG. 6 shows a cross-section of an object similar to the object shown in FIGS. 4a-d and 5. For example, the object includes portions 512 solidified using binder agent 406b lacking colorant and portions 510 solidified using coalescing agent 404. However, in this example, binder agents 406a having colorants are not applied to the exterior boundary of the object, for example because a colored object is not desired. The agents 404 and 406b may be delivered in patterns on the portions of layers that the agent delivery control data 208 may define to become solid to form part of the three-dimensional object being generated.

Figure 7:
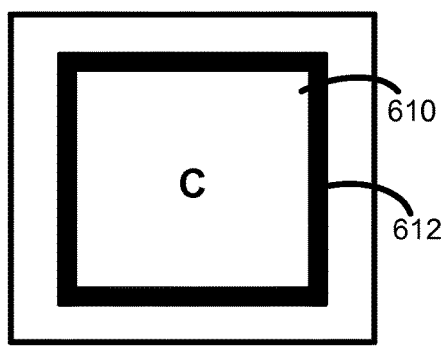
FIG. 7 shows a cross-sectional top view of a layer of build material according to some examples.

FIG. 7 shows a cross-section of an object similar to the object shown in FIGS. 4a-d and 5. For example, the object includes portions 612 solidified using binder agents 406a having colorants and portion 610 solidified using coalescing agent 404. However, in this example, the portion 610 comprises the entire object interior, therefore no binder agents 406b are used in the object interior. The agents 404 and 406a may be delivered in patterns on the portions of layers that the agent delivery control data 208 may define to become solid to form part of the three-dimensional object being generated.

Figure 8:
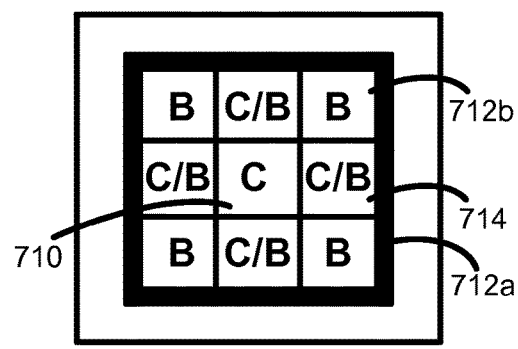
FIG. 8 shows a cross-sectional top view of a layer of build material according to some examples.

FIG. 8 shows a cross-section of an object similar to the object shown in FIGS. 4a-d and 5. For example, the object includes interior portions 712b solidified using binder agent 406b lacking colorant, exterior boundary portions 712a solidified using binder agents 406a having colorants, and portions 710 solidified using coalescing agent 404. However, in this example, there are additional portions 714 solidified using both binder agent 406b and coalescing agent 404, such that the portions 714 experience solidify through a combination of coalescence and binding into a binder matrix. The agents 404 and 406a-b may be delivered in patterns on the portions of layers that the agent delivery control data 208 may define to become solid to form part of the three-dimensional object being generated.

In an example, a system such as that shown in FIG. 2 may be used except that the system may not include the binding modifier agent distributor 202b. The coalescing agent may include an infrared (IR) light absorber. The binding agents may each include aqueous fluids including a polyvinyl acetate (PVA) adhesive or polyvinyl alcohol (PVOH) adhesive. The build material may include powdered polyamide 12 of thermally fusible particles, and/or adhesion promoters such as plaster particles and accelerator particles which may facilitate the PVA in bonding with the powder particles. The binder agents may, for example, also respectively include a colorant which can be one of black (K), white (W), cyan (C), yellow (Y), magenta (M), colorants with different colors, or no colorant. The binder agents may be UV curable, but this is not necessary. In examples in which the binder agents achieve binding without UV energy, the energy source may include an IR energy source to cause the portions with coalescing agent to coalesce. In examples in which the binder agents are UV curable, the energy source may include an IR energy source for coalescing agent and a UV energy source for binding agent. Each layer of powder may be in a thickness range of about 50 to about 150 microns. Layers may be solidified using the method 300 of FIG. 3. For example, binder agents with colorants may be provided on the exterior of the object. Additionally, some layers of an object may include both binder agent (without colorant) and coalescing agent in non-overlapping portions in the interior as shown in FIGS. 4a-4d and 5, whereas other layers of the object may include binder agent (without colorant) in the interior but not coalescing agent, and yet other layers of the object may include coalescing agent in the interior but not binding agent (without colorant). In some examples, in some interior portions there may be overlap such that a portion may receive both coalescing agent and binder agent (without colorant). The resulting object may have an arrangement of non-overlapping portions in three dimensions in which the powder particles are either coalesced, e.g. directly fused together, or bound, e.g. indirectly fused together. The delivery of agents may be based on agent delivery control data.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A system for generating a three-dimensional object, the system comprising:
    a first agent distributor configured to selectively deliver a binder agent onto a layer of powdered build material, the binder agent being a material that binds and solidifies powdered build material into a binder matrix, which is a mixture of generally separate powdered build material particles adhesively bound together by the binder agent;
    a second agent distributor configured to selectively deliver a coalescing agent onto the layer of powdered build material, the coalescing agent being a material that, when energy is applied to a combination of powdered build material and coalescing agent, causes particles in the powdered build material to melt;
    an energy source configured to apply energy to the layer of powdered build material; and
    a controller having computer executable instructions thereon that, when executed, cause the controller to:
    control the first agent distributor to deliver the binder agent on to a first portion of powdered build material in the layer in a first pattern derived from data representing a slice of the three-dimensional object, to bind and solidify the first portion of powdered build material into a binder matrix;
    control the second agent distributor to deliver the coalescing agent on to a second portion of powdered build material in the layer not overlapping the first portion in a second pattern derived from data representing the slice of the three-dimensional object; and
    control the energy source to melt the particles of powdered build material in the second portion.

2. The system of claim 1 wherein the binder agent comprises an adhesive that binds the first portion into the binder matrix.

3. The system of claim 1 wherein the layer of powdered build material includes an adhesive that is activated by the binder agent to bind the first portion into the binder matrix.

4. The system of claim 1 wherein the first portion is a first interior portion of the three dimensional object defined by the data, wherein the second portion is a second, different interior portion of the three-dimensional object defined by the data.

5. The system of claim 1 wherein the first portion is a surface portion of the three-dimensional object defined by the data, wherein the second portion is an interior portion of the three-dimensional object defined by the data.

6. The system of claim 5 wherein the binder agent comprises a colorant to provide color on a surface of the three-dimensional object.

7. The system of claim 6 wherein the binder agent comprises two or more of cyan, yellow, magenta, and black colorants.

8. The system of claim 1 further comprising a third agent distributor configured to selectively deliver a binding modifier agent onto portions of a layer of powdered build material, wherein the controller is to control the third agent distributor to selectively deliver the binding modifier agent in a third portion of the layer in a pattern derived from the data, the third portion being adjacent to the first portion, wherein the binding modifier agent is to reduce bleed from the first portion into the third portion.

9. The system of claim 1 wherein the first portion having the binder agent is to bind and solidify into a binder matrix upon application of energy to cure or dry the first portion.

10. A method for generating a three-dimensional object, the method comprising:
providing a layer of powdered build material on a support member;
selectively delivering a binder agent to a first portion of the layer to cause a binder matrix to form in the first portion, the binder agent being a material that binds and solidifies powdered build material into a binder matrix, which is a mixture of generally separate powdered build material particles adhesively bound together by the binder agent;
selectively delivering a coalescing agent to a second portion of the layer that does not overlap with the first portion, the coalescing agent being a material that, when energy is applied to a combination of powdered build material and coalescing agent, causes particles of the powdered build material to melt; and
applying energy to the layer to melt the particles of powdered build material in the second portion.

11. A non-transitory computer readable storage medium including executable instructions that, when executed by a processor, cause the processor to:
obtain data representing a slice of a three-dimensional object to be generated;
control a binder agent distributor to selectively deliver a binder agent onto a first portion of a layer of powdered build material in a first pattern derived from the data, the binder agent being a material that binds and solidifies powdered build material into a binder matrix, which is a mixture of generally separate powdered build material particles adhesively bound together by the binder agent; and
control a coalescing agent distributor to selectively deliver a coalescing agent onto a second portion of the layer not overlapping the first portion in a second pattern derived from the data, the coalescing agent being a material that, when energy is applied to a combination of powdered build material and coalescing agent, causes particles of the powdered build material to melt; and
control an energy source to apply energy to the layer to melt the particles of powdered build material in the second portion.

* * * * *